US010444345B2

United States Patent
Hara (10) Patent No.: US 10,444,345 B2
(45) Date of Patent: Oct. 15, 2019

(54) VEHICLE SURROUNDING SITUATION RECOGNIZING DEVICE AND VEHICLE CONTROL DEVICE

(71) Applicant: TOYOTA JIDOSHA KABUSHIKI KAISHA, Toyota-shi, Aichi (JP)

(72) Inventor: Kouichi Hara, Anjyo (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 298 days.

(21) Appl. No.: 15/113,855

(22) PCT Filed: Feb. 9, 2015

(86) PCT No.: PCT/JP2015/054052
§ 371 (c)(1),
(2) Date: Jul. 25, 2016

(87) PCT Pub. No.: WO2015/122510
PCT Pub. Date: Aug. 20, 2015

(65) Prior Publication Data
US 2016/0349364 A1    Dec. 1, 2016

(30) Foreign Application Priority Data

Feb. 17, 2014 (JP) .................. 2014-027515

(51) Int. Cl.
*G01S 13/93* (2006.01)
*G01S 13/86* (2006.01)
*G01S 13/00* (2006.01)

(52) U.S. Cl.
CPC .......... *G01S 13/931* (2013.01); *G01S 13/867* (2013.01); *G01S 2013/9375* (2013.01)

(58) Field of Classification Search
None
See application file for complete search history.

(56) References Cited

U.S. PATENT DOCUMENTS 5,325,082 A * 6/1994 Rodriguez .......... B60R 16/0315
340/438
6,037,860 A * 3/2000 Zander .................. G01S 13/931
307/10.1
6,246,933 B1 * 6/2001 Bague .................. G07C 5/0891
340/438

(Continued)

FOREIGN PATENT DOCUMENTS

CN          1704719 A      12/2005
GB          2514151 A  *  11/2014  ....... G08B 13/19647

(Continued)

*Primary Examiner* — Bernarr E Gregory
(74) *Attorney, Agent, or Firm* — Sughrue Mion, PLLC (57) ABSTRACT

A vehicle system includes a radar mounted on a front part of a vehicle, a camera mounted within a vehicle interior of the vehicle, and an electronic control unit (ECU). The ECU is configured to detect an object in front of the vehicle based on radar information from the radar and image information from the camera. The ECU is configured to detect a collision of the vehicle with an obstacle based on a frontal collision signal. The ECU is configured to detect the object using the image information, without using the radar information, after detecting the collision.

12 Claims, 6 Drawing Sheets

(56) References Cited

U.S. PATENT DOCUMENTS

| | | | |
|---|---|---|---|
| 6,405,132 B1* | 6/2002 | Breed | B60W 30/08 |
| | | | 701/117 |
| 6,492,935 B1 | 12/2002 | Higuchi | |
| 6,718,239 B2* | 4/2004 | Rayner | B60R 11/04 |
| | | | 340/541 |
| 7,180,407 B1* | 2/2007 | Guo | G07C 5/0891 |
| | | | 340/435 |
| 7,418,345 B2 | 8/2008 | Diebold et al. | |
| 7,570,198 B2 | 8/2009 | Tokoro | |
| 7,825,849 B2* | 11/2010 | Tsuchida | G01S 13/931 |
| | | | 342/52 |
| 9,798,002 B2* | 10/2017 | Baba | G01S 13/867 |
| 2003/0149530 A1* | 8/2003 | Stopczynski | B60R 21/013 |
| | | | 701/301 |
| 2005/0270225 A1 | 12/2005 | Tokoro | |
| 2007/0050114 A1* | 3/2007 | Koike | B60W 30/08 |
| | | | 701/45 |
| 2008/0014277 A1 | 1/2008 | Medri | |
| 2008/0147277 A1 | 6/2008 | Lu et al. | |
| 2014/0343750 A1* | 11/2014 | Minemura | B60W 30/085 |
| | | | 701/1 |

FOREIGN PATENT DOCUMENTS

| | | | | |
|---|---|---|---|---|
| JP | 2001-99930 A | 4/2001 | | |
| JP | 2005-37991 A | 2/2005 | | |
| JP | 2005-345251 A | 12/2005 | | |
| JP | 2007-516127 A | 6/2007 | | |
| WO | WO 00/05183 A1 * | 8/2000 | | G07C 5/08 |

* cited by examiner

VEHICLE SURROUNDING SITUATION RECOGNIZING DEVICE AND VEHICLE CONTROL DEVICE

CROSS REFERENCE TO RELATED APPLICATIONS

This application is a National Stage of International Application No. PCT/JP2015/054052 filed Feb. 9, 2015, claiming priority based on Japanese Patent Application No. 2014-027515 filed Feb. 17, 2014, the contents of all of which are incorporated herein by reference in their entirety.

TECHNICAL FIELD

The present invention relates to a vehicle surrounding situation recognizing device and a vehicle control device.

BACKGROUND ART

Conventionally, there is a device which recognizes a situation in front of a vehicle. For example, Patent Literature 1 discloses technology of an obstacle recognizing device provided with a radar which detects presence of an object around the vehicle, an imaging means which images the object, an obstacle detecting means which detects an obstacle in vehicle travel based on an output of the radar, and a determination reference value changing means which changes a determination reference value in obstacle detection of the obstacle detecting means based on image information of an image taken by the imaging means.

CITATION LIST

Patent Literature

Patent Literature 1: Japanese Patent Application Laid-open No. 2005-345251

DISCLOSURE OF INVENTION

Problems to be Solved by the Invention

Technology to reduce damage from secondary collision after primary collision is investigated. When damage reducing control to reduce the damage from the secondary collision is executed, it is desirable that a situation in front of a vehicle can be recognized with accuracy. In the vehicle including a plurality of means of recognizing the situation in front of the vehicle, in the case where any means is damaged from the primary collision, continuous use of the damaged means after the primary collision might deteriorate recognition accuracy. For example, in the vehicle equipped with image generating means within a vehicle interior and radar on a front part of the vehicle, it is considered that the radar is likely to be damaged from the primary collision. Therefore, it is considered that the recognition accuracy is likely to be deteriorated by usage of radar information after the primary collision. It is desirable that the deterioration in accuracy of forward recognition of the vehicle after the primary collision is inhibited.

An object of the present invention is to provide the vehicle surrounding situation recognizing device and the vehicle control device capable of inhibiting the deterioration in accuracy of the forward recognition of the vehicle after the primary collision.

Solutions to the Problems

A vehicle surrounding situation recognizing device according to the present invention includes a radar mounted on a front part of a vehicle and configured to transmit an electromagnetic wave forward of the vehicle, receive a reflective wave of the electromagnetic wave to detect a situation in front of the vehicle, and output as radar information; an image generating means mounted within a vehicle interior of the vehicle and configured to generate an image in front of the vehicle and output as image information; a recognizing means configured to recognize the situation in front of the vehicle based on the radar information and the image information; and a collision detecting means configured to detect that the vehicle collides with an obstacle outside the vehicle, wherein the recognizing means recognizes the situation in front of the vehicle not based on the radar information but based on the image information at the time the collision is detected.

A vehicle surrounding situation recognizing device according to the present invention includes a recognizing means configured to recognize a situation in front of a vehicle based on radar information and image information; and a collision detecting means configured to detect that the vehicle collides with an obstacle outside the vehicle, wherein the radar information is obtained from a radar mounted on a front part of the vehicle which transmits an electromagnetic wave forward of the vehicle and receives a reflective wave of the electromagnetic wave to detect the situation in front of the vehicle, the image information is obtained from an image generating means mounted within a vehicle interior of the vehicle which generates an image in front of the vehicle, and the recognizing means recognizes the situation in front of the vehicle not based on the radar information but based on the image information at the time the collision is detected.

In the vehicle surrounding situation recognizing device, it is preferable to further include a collision situation detecting means configured to detect a situation of the collision, wherein the recognizing means preferably recognize the situation in front of the vehicle not based on the radar information but based on the image information at the time the collision is detected is a collision between the obstacle and the front part of the vehicle.

In the vehicle surrounding situation recognizing device, it is preferable that the recognizing means recognizes the situation in front of the vehicle not based on the radar information but based on the image information at the time the collision is detected is a collision between the obstacle and a front face of the vehicle.

A vehicle control device according to the present invention includes the vehicle surrounding situation recognizing device; and a damage reducing means configured to control motion of the vehicle based on the situation in front of the vehicle recognized by the recognizing means, and reduce damage from a secondary collision after the collision.

Effects of the Invention

A vehicle surrounding situation recognizing device according to the present invention is provided with a radar mounted on a front part of a vehicle which transmits an electromagnetic wave forward of the vehicle and receives a reflective wave of the electromagnetic wave to detect a situation in front of the vehicle, and outputs as radar information; an image generating means mounted within a vehicle interior of the vehicle which generates a forward image of the vehicle to output as image information; a recognizing means which recognizes the situation in front of the vehicle based on the radar information and the image information; and a collision detecting means which detects that the vehicle collides with an obstacle outside the vehicle, in which the recognizing means recognizes the situation in front of the vehicle not based on the radar information but based on the image information when the collision is detected. The vehicle surrounding situation recognizing device according to the present invention has an effect that deterioration in accuracy of forward recognition of the vehicle after the primary collision can be inhibited.

DESCRIPTION OF EMBODIMENTS

A vehicle surrounding situation recognizing device and a vehicle control device according to embodiments of the present invention are hereinafter described in detail with reference to the drawings. Meanwhile, the present invention is not limited by the embodiments. Components in the following embodiments include a component easily conceived of by one skilled in the art or a substantially identical component.

[First Embodiment]

Figure 1:
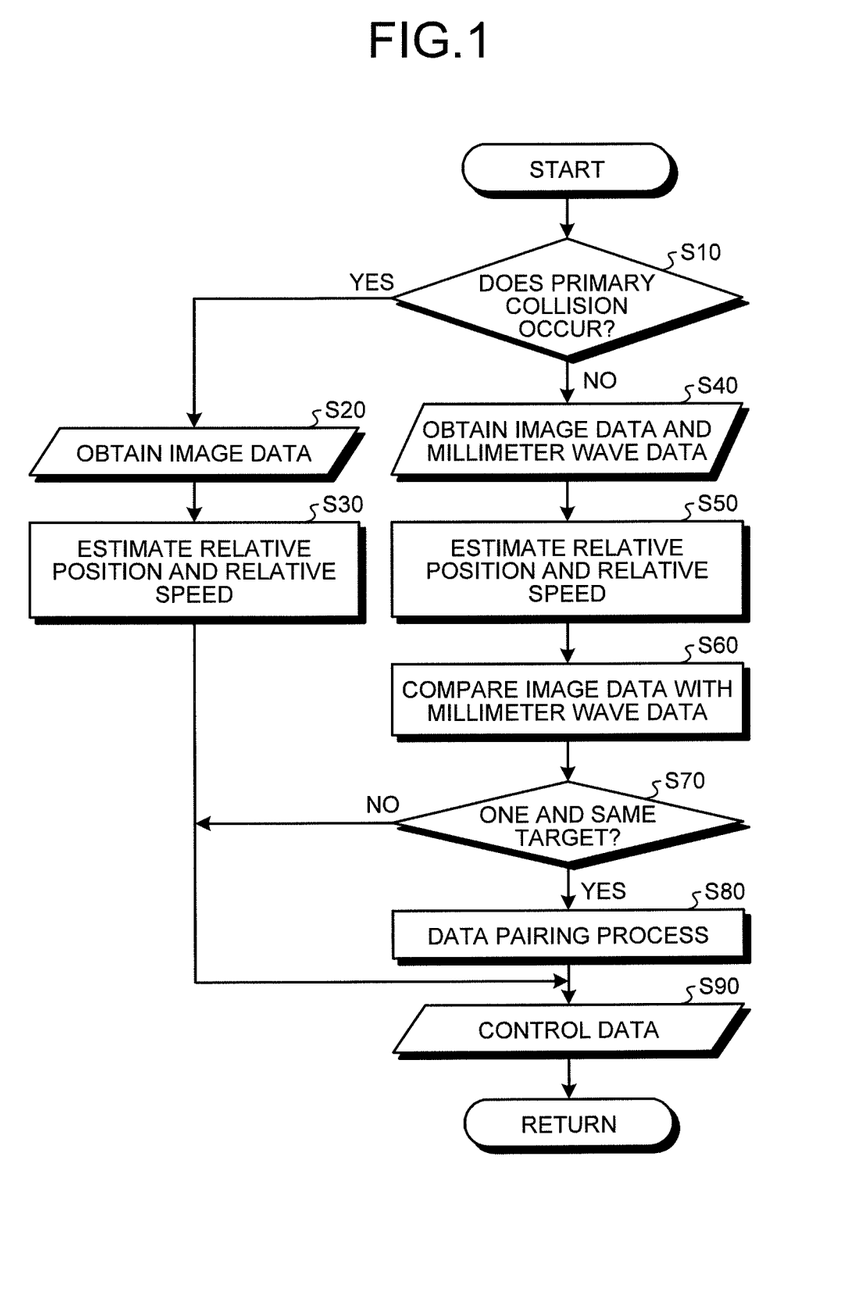
FIG. 1 is a flowchart of operation of a vehicle surrounding situation recognizing device according to a first embodiment.
Figure 2:
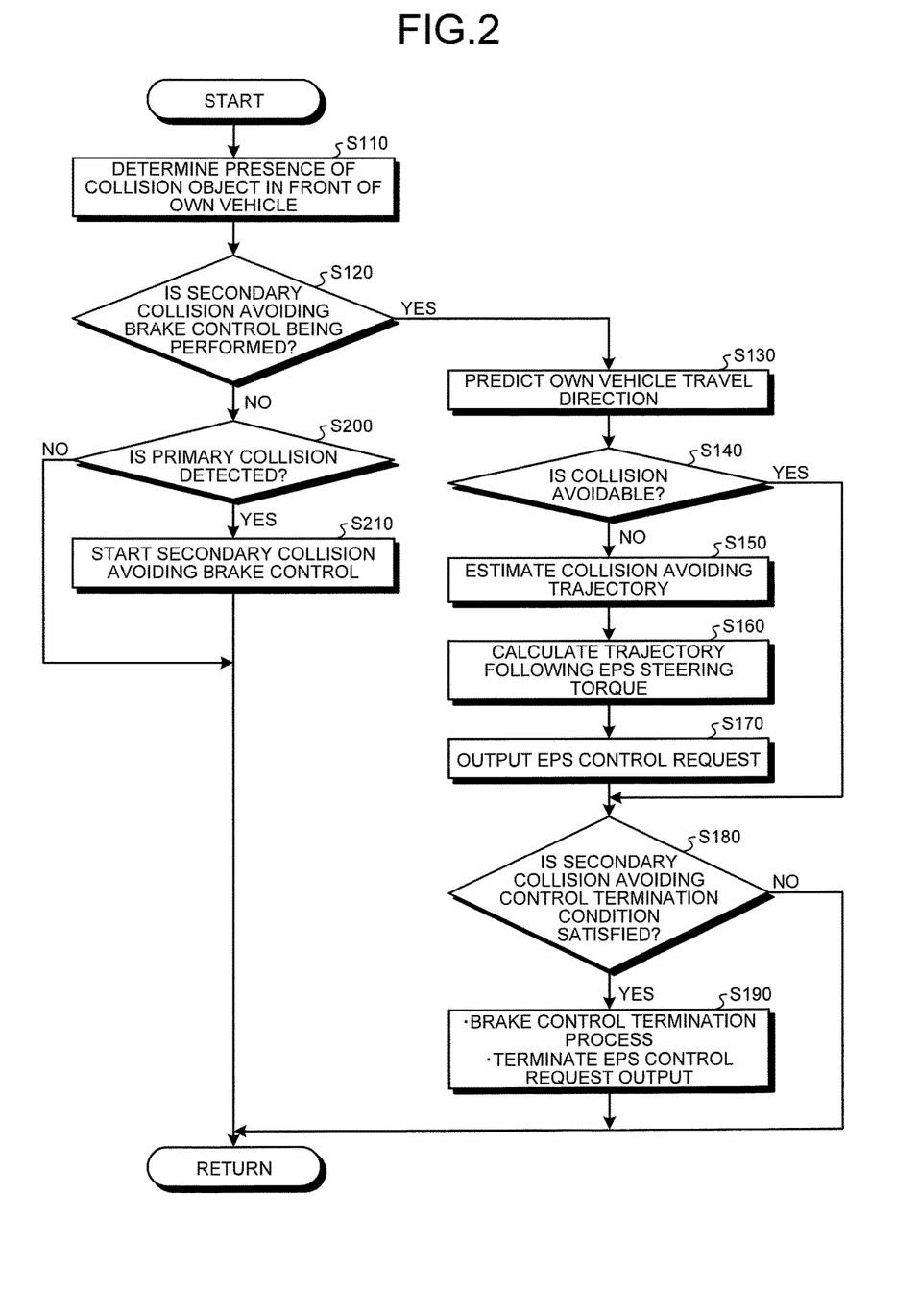
FIG. 2 is a flowchart of operation of a vehicle control device according to the first embodiment.
Figure 4:
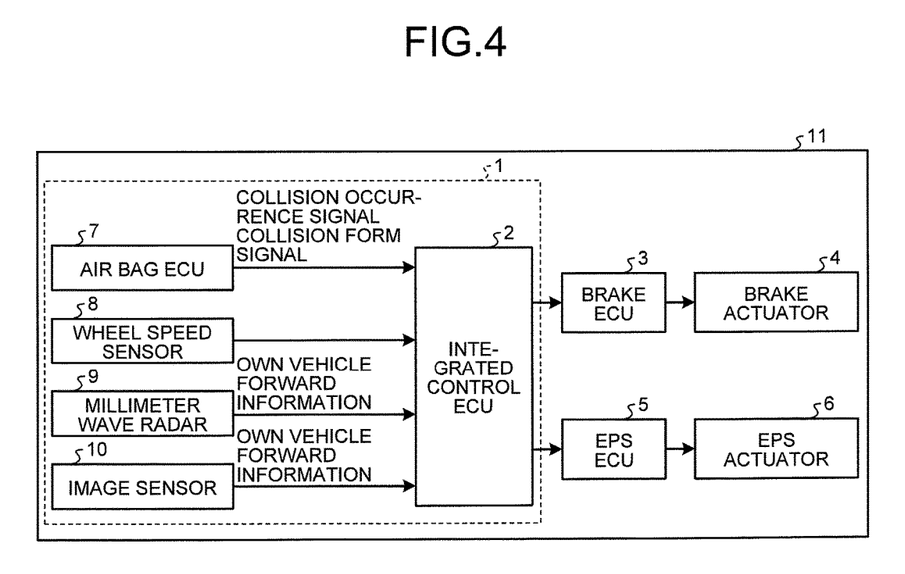
FIG. 4 is a block diagram of the vehicle surrounding situation recognizing device and the vehicle control device according to the first embodiment.
Figure 5:
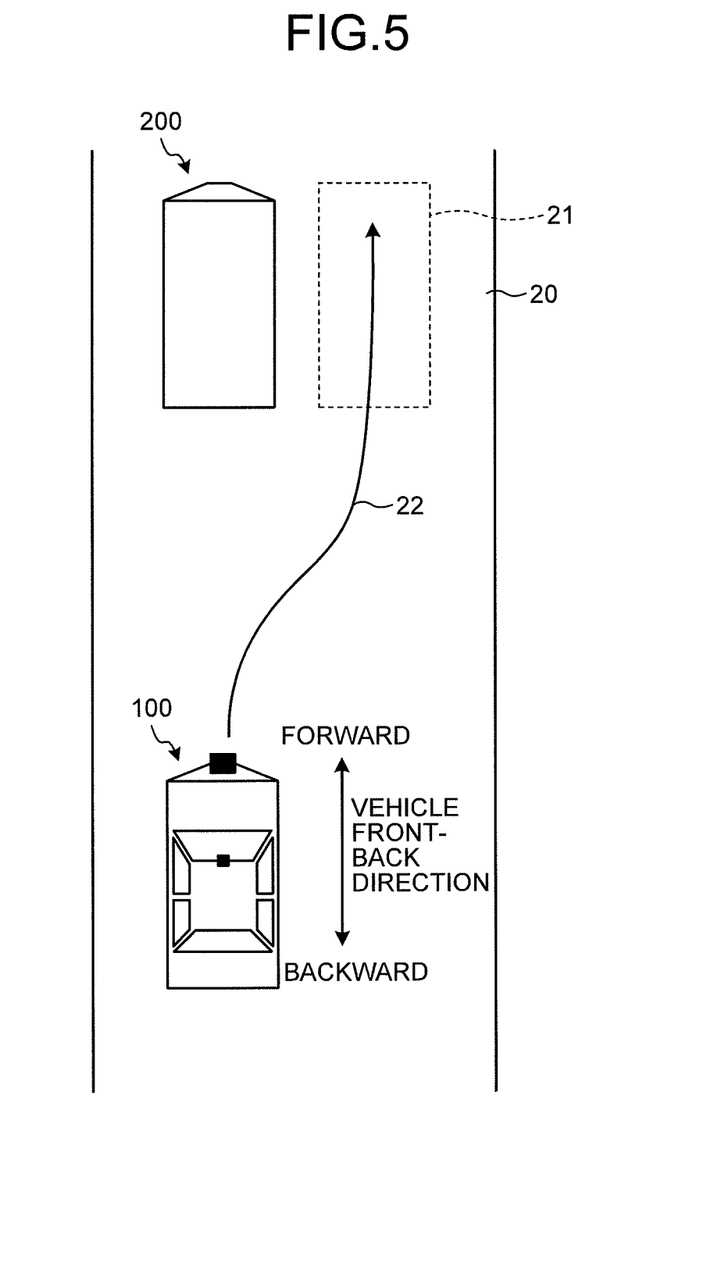
FIG. 5 is an illustrative diagram of vehicle control according to the first embodiment.

A first embodiment is described with reference to FIGS. 1 to 5. This embodiment relates to a vehicle surrounding situation recognizing device and a vehicle control device. FIG. 1 is a flowchart of operation of the vehicle surrounding situation recognizing device according to the first embodiment of the present invention, FIG. 2 is a flowchart of operation of the vehicle control device according to the first embodiment, FIG. 3 is a schematic configuration diagram of a vehicle according to the first embodiment, FIG. 4 is a block diagram of the vehicle surrounding situation recognizing device and the vehicle control device according to the first embodiment, and FIG. 5 is an illustrative diagram of vehicle control according to the first embodiment.

A vehicle 100 according to this embodiment is equipped with a system which performs deceleration by brake control and the like in order to reduce damage from secondary collision after primary collision. This system provided with a millimeter wave radar sensor arranged on a front part of the vehicle and a camera arranged within a vehicle interior as a forward sensor which recognizes a forward situation detects forward information by fusion of millimeter wave data and image data. The system of this embodiment switches to forward information detection by the camera only after the primary collision. The camera is less likely to be broken than the radar sensor because of its mount position. Therefore, the system of this embodiment can determine possibility of the secondary collision with accuracy.

Figure 3:
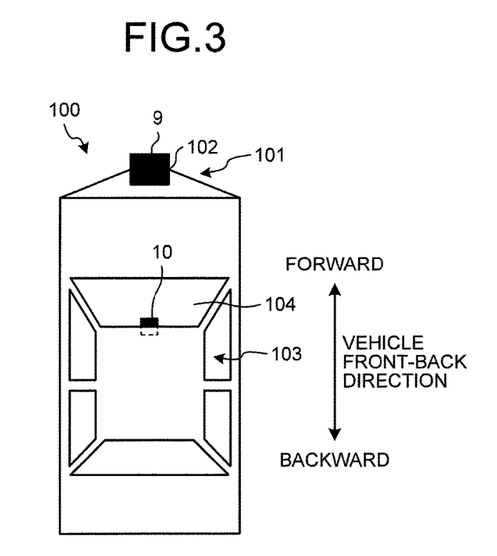
FIG. 3 is a schematic configuration diagram of a vehicle according to the first embodiment.

As illustrated in FIG. 3, the vehicle 100 includes a radar 9 and an image generating means 10. The radar 9 is mounted on a front part 101 of the vehicle 100. The radar 9 of this embodiment is arranged on a front grille 102 arranged on the front part 101 of the vehicle 100. The radar 9 is arranged on a rear side of the front grille 102, that is to say, behind the front grille 102 in a vehicle direction, for example. The radar 9 transmits an electromagnetic wave forward of the vehicle and receives a reflective wave of the electromagnetic wave to detect a situation (reflecting object) in front of the vehicle, and outputs the same as radar information. Herein, an area in front of the vehicle includes not only the front of the vehicle 100 but also a diagonal front area of the vehicle. A millimeter wave radar which transmits a millimeter radio wave, a laser radar which transmits laser light and the like are used as the radar 9, for example. That is to say, the electromagnetic wave transmitted by the radar 9 is not limited to the radio wave and may be light such as laser light. A wavelength of the electromagnetic wave transmitted by the radar 9 is not limited to the wavelength classified as the millimeter wave. For example, the laser light transmitted by the laser radar may be visible light, ultraviolet light, and infrared light. The radar 9 outputs the radar information indicating a direction of the reflecting object, a distance to the reflecting object, a speed of the reflecting object and the like based on the received reflective wave.

The image generating means 10 mounted within a vehicle interior 103 of the vehicle 100 generates a forward image of the vehicle and outputs the same as image information. The image generating means 10 of this embodiment being the camera which images a scene in front of the vehicle to generate the image data of the scene includes an imaging device such as a charge coupled device (CCD), for example. The image generating means 10 of this embodiment images the scene in front of the vehicle to obtain information related to color and luminance of each pixel and generates the image data in which the obtained information is associated with each pixel. The image generating means 10 of this embodiment is a stereo camera including a plurality of imaging devices which generates a stereo image. The image generating means 10 outputs the generated image data as image information. The image generating means 10 is arranged within the vehicle interior 103, for example, in the vicinity of a front window 104.

As illustrated in FIG. 4, a vehicle surrounding situation recognizing device 1 of this embodiment includes an integrated control ECU 2, an air bag ECU 7, a wheel speed sensor 8, the radar 9, and the image generating means 10. A vehicle control device 11 of this embodiment includes the vehicle surrounding situation recognizing device 1, a brake ECU 3, a brake actuator 4, an EPS_ECU 5, and an EPS actuator 6.

The air bag ECU 7 is an air bag control device which controls an air bag not illustrated. The air bag ECU 7 includes acceleration detecting means which detects acceleration of the vehicle 100. The air bag ECU 7 serves as collision detecting means which detects that the vehicle 100 collides with an obstacle outside the vehicle. The acceleration detecting means detects the acceleration in a front-back direction of the vehicle 100 (hereinafter, simply referred to as "front-back G") and the acceleration in a vehicle width direction orthogonal to the front-back direction (hereinafter, simply referred to as "lateral G"). The acceleration detecting means is arranged in a barycentric position of the vehicle 100 and on a so-called B pillar of the vehicle 100, for example. The acceleration detecting means arranged on the B pillar detects that the obstacle collides from the side toward the vehicle interior 103. For example, when a value of the lateral G detected on the B pillar is not smaller than a predetermined value, the air bag ECU 7 determines that a collision form is the collision form in which the obstacle collides with the B pillar or the collision form in which the obstacle collides from the side toward the vehicle interior 103.

The air bag ECU 7 inflates the air bag based on the acceleration detected by the acceleration detecting means. The air bag ECU 7 inflates the air bag arranged in front of a passenger based on the front-back G. The air bag ECU 7 also inflates the air bag arranged lateral to the passenger such as a side air bag and a curtain shield air bag based on the lateral G. The air bag ECU 7 of this embodiment inflates the air bags when the front-back G and the lateral G larger than a predetermined threshold value are detected.

The wheel speed sensor 8 detects a rotational speed of a wheel of the vehicle 100. A vehicle speed and the like is calculated based on the wheel speed of each wheel detected by the wheel speed sensor 8. The air bag ECU 7, the wheel speed sensor 8, the radar 9, and the image generating means 10 are electrically connected to the integrated control ECU 2 and output signals indicating detection results and the like to the integrated control ECU 2.

The air bag ECU 7 outputs a collision occurrence signal indicating that the vehicle 100 collides with the obstacle outside the vehicle to the integrated control ECU 2 based on the detected acceleration. The air bag ECU 7 outputs the collision occurrence signal when the acceleration of certain magnitude or larger is detected, for example.

The air bag ECU 7 also has a function as collision situation detecting means which detects a situation of the collision. The air bag ECU 7 outputs a collision form signal indicating the collision form to the integrated control ECU 2. The air bag ECU 7 outputs a front-back collision signal indicating that the collision in the front-back direction occurs when the front-back G of certain magnitude or larger is detected and the lateral G detected at the same time is a small value. The air bag ECU 7 outputs a frontal collision signal indicating that the collision is such that the obstacle collides with a front face of the vehicle 100 when backward acceleration is generated in the vehicle 100 at the time of the collision in the front-back direction. On the other hand, the air bag ECU 7 outputs a rear collision signal indicating that the collision is such that the obstacle collides with the rear of the vehicle 100 when forward acceleration is generated in the vehicle 100 at the time of the collision in the front-back direction.

The air bag ECU 7 outputs a side collision signal indicating that the obstacle collides with the vehicle 100 from the side when the lateral G of certain magnitude or larger is detected and the front-back G detected at the same time is a small value.

Each of the radar 9 and the image generating means 10 outputs own vehicle forward information to the integrated control ECU 2. The own vehicle forward information output by the radar 9 is information regarding the reflecting object in front of the vehicle 100 based on the reflective wave. The own vehicle forward information output by the image generating means 10 is the image data generated by imaging of the scene in front of the vehicle 100.

The integrated control ECU 2 has a function to integrally control the vehicle 100. The ECUs 2, 3, 5, and 7 of this embodiment are electronic control units including a computer. The integrated control ECU 2 has a function as a recognizing means which recognizes the situation in front of the vehicle based on the radar information obtained from the radar 9 and the image information obtained from the image generating means 10. The integrated control ECU 2 executes a data pairing process based on the radar information and the image information to recognize the situation in front of the vehicle. Regarding one and the same target, the integrated control ECU 2 generates control data related to the target by gathering target information calculated from the radar information and target information calculated from the image information. The method disclosed in Japanese Patent Application Laid-open No. 2001-99930 may be used, for example, as a method of the data pairing.

In the data pairing, any one of values of the target information obtained from the image information and the target information obtained from the radar information may be adopted as the control data or a new value calculated from the two pieces of target information may be used as the control data. It becomes possible to improve recognition accuracy by recognizing a collision object by the data pairing of the radar information and the image information.

When the vehicle 100 collides with the obstacle such as another vehicle, the secondary collision might occur. The secondary collision is the collision of the vehicle 100 with another vehicle, a structure and the like after the collision with the obstacle. It is desirable that the damage from the secondary collision, for example, the damage of the vehicle 100 and the passenger of the vehicle 100, the damage of another vehicle and the structure, and the damage of surrounding pedestrians and the like may be reduced. The integrated control ECU 2 of this embodiment has a function as damage reducing means which controls motion of the vehicle 100 based on the situation in front of the vehicle recognized by the recognizing means to reduce the damage from the secondary collision after the primary collision. The integrated control ECU 2 of this embodiment tries to avoid the secondary collision and reduce the damage from the secondary collision by automatic brake control and automatic turning control.

Specifically, the integrated control ECU 2 puts a brake on the vehicle 100 when initial collision (primary collision) with the obstacle occurs. According to this, the secondary collision can be avoided and the damage from the secondary collision can be reduced. The vehicle control device 11 includes the brake ECU 3 and the brake actuator 4 as means of executing the automatic brake control. The brake actuator 4 is a braking force generating device which generates braking force on each wheel of the vehicle 100. The integrated control ECU 2 outputs an instruction value of the braking force generated on each wheel as a request value to the brake ECU 3. The brake ECU 3 controls the braking force on each wheel generated by the brake actuator 4 so as to realize the received request value. The instruction value of the braking force is determined based on a relative distance to a forward target, a speed relative to the same and the like, for example.

The integrated control ECU 2 executes automatic turning control based on the situation in front of the vehicle recognized by the recognizing means. The integrated control ECU 2 determines whether the secondary collision can be avoided by the automatic brake control when the obstacle being the collision object is detected in front of the vehicle 100. The integrated control ECU 2 calculates a trajectory along which the collision with the obstacle can be avoided and executes automatic turning so as to allow the vehicle 100 to travel along the trajectory when it is predicted that the secondary collision cannot be avoided only by the automatic brake control. The EPS_ECU 5 and the EPS actuator 6 are included as means of executing the automatic turning control. The EPS actuator 6 is an actuator of an electric power steering (EPS) device. The EPS actuator 6 includes a power source such as a motor which generates turning force to turn a steering wheel of the vehicle 100. The EPS actuator 6 can adjust a turning angle of the steering wheel at an optional angle. The EPS_ECU 5 outputs a target turning angle of the steering wheel to the EPS actuator 6. The EPS actuator 6 controls operation of the power source so as to realize the target turning angle.

Herein, it is desirable that deterioration in accuracy of the recognition of the collision object can be inhibited when control for avoiding the secondary collision and reducing the damage from the secondary collision (hereinafter, referred to as "damage reducing control") is executed. For example, in the case where axis deviation or breakdown of the radar 9 occurs due to the primary collision, recognizing the situation in front of the vehicle relying on the radar information of the radar 9 might deteriorate the recognition accuracy.

The vehicle surrounding situation recognizing device 1 of this embodiment recognizes the situation in front of the vehicle not based on the radar information but based on the image information when it is detected that the vehicle 100 collides with the obstacle outside the vehicle. According to this, the deterioration in the accuracy of the recognition of the situation in front of the vehicle can be inhibited as described hereinafter. When the radar 9 is compared with the image generating means 10, possibility that the radar 9 is damaged is considered to be higher than the possibility that the image generating means 10 is damaged when the vehicle 100 collides with the obstacle. The vehicle 100 has a configuration to protect the passenger in the vehicle interior 103 from the damage. Therefore, the image generating means 10 mounted within the vehicle interior 103 is less likely to be damaged from the collision than the radar 9. Therefore, the vehicle surrounding situation recognizing device 1 recognizes the situation in front of the vehicle based on the image information considered to be relatively more reliable after the primary collision.

The operation of the vehicle surrounding situation recognizing device 1 is described with reference to FIG. 1. A control flow illustrated in FIG. 1 is repeatedly executed at a predetermined interval, for example.

At step S10, the integrated control ECU 2 determines whether the primary collision occurs. The integrated control ECU 2 performs the determination at step S10 based on the collision occurrence signal obtained from the air bag ECU 7, for example. When it is determined that the primary collision occurs as a result of the determination at step S10 (step S10-Y), the procedure shifts to step S20, and otherwise (step S10-N), the procedure shifts to step S40.

The integrated control ECU 2 obtains the image data at step S20. The integrated control ECU 2 obtains the image data as the image information from the image generating means 10. When step S20 is executed, the procedure shifts to step S30.

The integrated control ECU 2 estimates a relative position and the relative speed at step S30. The integrated control ECU 2 detects the target in front of the vehicle based on stereo image data obtained from the image generating means 10 and estimates the position and the speed of the detected target relative to the vehicle 100. The integrated control ECU 2 extracts the target in front of the vehicle and estimates the position of the extracted target based on information of parallax and luminance of the two pieces of image data, for example. The integrated control ECU 2 estimates the relative speed of the target based on change in the position of the extracted target relative to the vehicle 100. The integrated control ECU 2 can also estimate a type, an attitude and the like of the extracted target by pattern matching. When step S30 is executed, the procedure shifts to step S90.

The integrated control ECU 2 obtains the image data and the millimeter wave data at step S40. The integrated control ECU 2 obtains the image data as the image information from the image generating means 10. The integrated control ECU 2 obtains the millimeter wave data as the radar information from the radar 9. When step S40 is executed, the procedure shifts to step S50.

The integrated control ECU 2 estimates the relative position and the relative speed at step S50. The integrated control ECU 2 estimates the relative position and the relative speed based on the image data as at step S30, for example. The integrated control ECU 2 detects the target in front of the vehicle and estimates the position and the speed of the detected target relative to the vehicle 100 based on the radar information obtained from the radar 9. When step S50 is executed, the procedure shifts to step S60.

The integrated control ECU 2 executes comparison between the image data and the millimeter wave data at step S60. The integrated control ECU 2 compares the target recognized based on the image data with the target recognized based on the millimeter wave data to determine corresponding targets. When one target a is detected based on the image data and one target A is detected based on the millimeter wave data, the target a and the target A are associated with each other. When a plurality of targets are detected in at least any one of the image data and the millimeter wave data, the targets with the highest degree of coincidence are associated with each other. For example, a case in which targets a, b, and c are detected based on the image data and a plurality of targets A, B, and C are detected based on the millimeter wave data is described. In this case, out of the targets A, B, and C, the target whose values of the relative position and the relative speed have the highest degree of coincidence with the values of the relative position and the relative speed of the target a is associated with the target a. The targets b and c are also associated with any one of the targets A, B, and C. The association of the target a and the association of each of the targets b and c may be executed in one flow or the association of the targets a, b, and c may be sequentially performed in each execution of the control flow. When step S60 is executed, the procedure shifts to step S70.

At step S70, the integrated control ECU 2 determines whether the associated targets are one and the same target. When the target a and the target A are associated with each other at step S60, the degree of coincidence between the relative position and relative speed of the target a and the relative position and relative speed of the target A is calculated. When the degree of coincidence is not smaller than a predetermined value, it is determined that the targets a and A are one and the same target. When it is determined that the targets are one and the same target as a result of the determination at step S70 (step S70-Y), the procedure shifts to step S80, and otherwise (step S70-N), the procedure shifts to step S90.

At step S80, the integrated control ECU 2 performs the data pairing process. The integrated control ECU 2 executes the data pairing process for a group of the targets determined to be one and the same target and determines information about the target, for example, the values of the position and the speed relative to the vehicle 100 and values of width and height of the target. When step S80 is executed, the procedure shifts to step S90.

At step S90, the integrated control ECU 2 generates the control data. When the data pairing process is performed at step S80, the integrated control ECU 2 makes the values of the relative position, the relative speed and the like of the target determined by the data pairing the data for vehicle control. When it is determined that the targets are not one and the same target at step S70 and the procedure shifts to step S90, the integrated control ECU 2 makes the relative position and the relative speed of the target the data for the vehicle control without executing the data pairing process. In this case, it is also possible that the relative position and the relative speed of the target are determined based on any one of the image information and the radar information. For example, it is also possible that only the information estimated to have relatively high detection accuracy out of the radar information and the image information is used based on the distance to the target.

When it is positively determined at step S10 and the procedure shifts to step S90 through steps S20 and S30, that is to say, after the primary collision occurs, the integrated control ECU 2 generates the control data based on the image information. The integrated control ECU 2 makes the values of the relative position, the relative speed and the like of the target in front of the vehicle based on the image information the data for the vehicle control. The integrated control ECU 2 generates the control data for all the detected targets, for example. When step S90 is executed, this control flow is terminated.

Next, the operation of the vehicle control device 11 of this embodiment is described with reference to FIG. 2. A control flow illustrated in FIG. 2 is repeatedly executed at a predetermined interval, for example. Meanwhile, the control flow illustrated in FIG. 2 may also be executed subsequent to the control flow in FIG. 1.

At step S110, the integrated control ECU 2 determines the collision object present in front of its own vehicle. The integrated control ECU 2 executes step S110 based on the data for the vehicle control generated in the control flow illustrated in FIG. 1. The integrated control ECU 2 determines whether the target satisfies a condition as the collision object for each target generated as the control data. The integrated control ECU 2 determines whether the target is the collision object based on the relative distance of the target to the vehicle 100 and an orientation of the target as seen from the vehicle 100, for example. In this case, when the relative distance of the target is not longer than a predetermined distance and when a difference between the orientation of the target and an orientation indicating a direction in which the vehicle 100 travels is not larger than a predetermined value, the target can be determined to be the collision object. The integrated control ECU 2 may further determine that the target is the collision object based on the speed of the target relative to the vehicle 100. The integrated control ECU 2 detects all the targets satisfying the condition as the collision object. When step S110 is executed, the procedure shifts to step S120.

At step S120, the integrated control ECU 2 determines whether secondary collision avoiding brake control is being performed. When the automatic brake control after the primary collision is being executed, the integrated control ECU 2 positively determines at step S120. As a result of the determination at step S120, when it is determined that the secondary collision avoiding brake control is being performed (step S120-Y), the procedure shifts to step S130, and otherwise (step S120-N), the procedure shifts to step S200.

At step S130, the integrated control ECU 2 predicts an own vehicle travel direction. The integrated control ECU 2 recognizes the target currently present in front of its own vehicle in the travel direction. When step S130 is executed, the procedure shifts to step S140.

At step S140, the integrated control ECU 2 determines whether the collision can be avoided. The integrated control ECU 2 determines whether the secondary collision with the target in front of the vehicle can be avoided by the automatic brake control. The integrated control ECU 2 positively determines at step S140 when the vehicle 100 can be stopped without the collision with the target based on the relative position and the relative speed of the target, and the braking force generated by the automatic brake control for the target recognized to be present in front of the vehicle at step S130, for example. As a result of the determination at step S140, when it is determined that the collision with the forward target can be avoided (step S140-Y), the procedure shifts to step S180, and otherwise (step S140-N), the procedure shifts to step S150.

At step S150, the integrated control ECU 2 estimates a collision avoiding trajectory. For example, as illustrated in FIG. 5, when another vehicle 200 is detected in front and when the secondary collision with the other vehicle 200 cannot be avoided only by the automatic brake control, a collision avoiding trajectory 22 is calculated. The other vehicle 200 is detected in front of the vehicle 100 on a road 20 on which the vehicle 100 travels. The other vehicle 200 stops or travels in the same direction as the vehicle 100 at a lower speed. FIG. 5 illustrates a situation in which an inter-vehicle interval between the vehicle 100 and the other vehicle 200 is not sufficient and it is determined that the collision with the other vehicle 200 cannot be avoided only by the automatic brake control. The integrated control ECU 2 calculates the collision avoiding trajectory 22 when there is a space 21 through which the vehicle 100 can pass beside the other vehicle 200. The collision avoiding trajectory 22 is the trajectory along which it is estimated that the vehicle 100 can travel without contact with the other vehicle 200. The integrated control ECU 2 generates the collision avoiding trajectory 22 based on a predicted position on the road 20 of the other vehicle 200 at each time point in the future, for example. When step S150 is executed, the procedure shifts to step S160.

At step S160, the integrated control ECU 2 calculates target steering torque. The integrated control ECU 2 calculates the target turning angle for allowing the vehicle 100 to travel while following the generated collision avoiding trajectory 22 and calculates the target steering torque for realizing the target turning angle. When step S160 is executed, the procedure shifts to step S170.

At step S170, the integrated control ECU 2 outputs a control request. The integrated control ECU 2 outputs the target steering torque calculated at step S160 as a request value to the EPS_ECU 5. The EPS_ECU 5 outputs the requested target steering torque by controlling the EPS actuator 6. When step S170 is executed, the procedure shifts to step S180.

At step S180, the integrated control ECU 2 determines whether a termination condition of the secondary collision avoiding control is satisfied. The integrated control ECU 2 does not terminate the braking by the secondary collision avoiding brake control at least until the vehicle 100 stops when the secondary collision avoiding brake control is being performed and the automatic turning control is being executed. The integrated control ECU 2 of this embodiment prohibits brake release until a predetermined time period elapses from the start of the secondary collision avoiding brake control (automatic brake control) and allows the brake release after a predetermined time period elapses. When it is determined that the vehicle 100 is in a stopping state after the brake release is allowed, the automatic brake control by the secondary collision avoiding brake control is terminated. Meanwhile, when the vehicle 100 already stops before a predetermined time period elapses from the start of the secondary collision avoiding brake control, the brake release is not allowed until a predetermined prolonged time period elapses after a predetermined time period elapses. That is to say, when the vehicle 100 does not stop yet when a predetermined time period elapses from the start of the secondary collision avoiding brake control, the brake release is allowed when the vehicle 100 stops thereafter, and when the vehicle 100 already stops when a predetermined time period elapses, the brake release is allowed when a predetermined prolonged time period further elapses thereafter. The integrated control ECU 2 positively determines at step S180 when the brake release is allowed.

Meanwhile, when the automatic turning control is not being executed while the secondary collision avoiding brake control is being performed, it may be positively determined at step S180 when at least any one of following conditions 1 to 3 is satisfied, for example. As a result of the determination at step S180, when it is determined that the termination condition of the secondary collision avoiding control is satisfied (step S180-Y), the procedure shifts to step S190, and otherwise (step S180-N), this control flow is terminated.
(Condition 1) The vehicle speed of the own vehicle is not higher than a termination vehicle speed set value (for example 10 km/h).
(Condition 2) Control duration is not shorter than a maximum control time period.
(Condition 3) The driver performs acceleration operation (accelerator is on).

At step S190, the integrated control ECU 2 performs a termination process of the brake control and a termination process of the turning control. The integrated control ECU 2 switches the request value to the brake ECU 3 from the request value of the automatic brake control for avoiding the secondary collision to a normal request value, for example, the request value according to a brake operation amount by the driver. The integrated control ECU 2 switches the request value to the brake EPS_ECU 5 from the request value of the automatic turning control for avoiding the secondary collision to the normal request value, for example, the request value according to a steering operation amount by the driver. When step S190 is executed, this control flow is terminated.

When it is negatively determined at step S120 and the procedure shifts to step S200, the integrated control ECU 2 determines whether the primary collision is detected at step S200. The integrated control ECU 2 performs the determination at step S200 based on the information obtained from the air bag ECU 7. As a result of the determination at step S200, when it is determined that the primary collision is detected (step S200-Y), the procedure shifts to step S210, and otherwise (step S200-N), this control flow is terminated.

At step S210, the integrated control ECU 2 starts the secondary collision avoiding brake control. The integrated control ECU 2 outputs a target braking amount of each wheel as the request value to the brake ECU 3 so as to rapidly decelerate the vehicle 100 to stop. The target braking amount is a predetermined maximum braking amount, for example. The brake ECU 3 controls the brake actuator 4 so as to realize the requested target braking amount. When step S210 is executed, this control flow is terminated.

Since the vehicle surrounding situation recognizing device 1 of this embodiment recognizes the surrounding situation by the image generating means 10 in the vehicle interior 103 which is less likely to be deviated by the primary collision while inhibiting erroneous control of a secondary collision damage reducing system based on a result of recognition with a deviated radio wave applying direction when the radio wave applying direction of the radar 9 is deviated by the primary collision, it is possible to recognize the surrounding situation with accuracy and execute the control of the secondary collision damage reducing system with accuracy.

Meanwhile, at step S10, it may be positively determined only when the air bag is activated in the primary collision, for example. That is to say, even in the case of the collision with the obstacle, if the air bag is not activated, it may be negatively determined at step S10.

[Second Embodiment]

Figure 6:
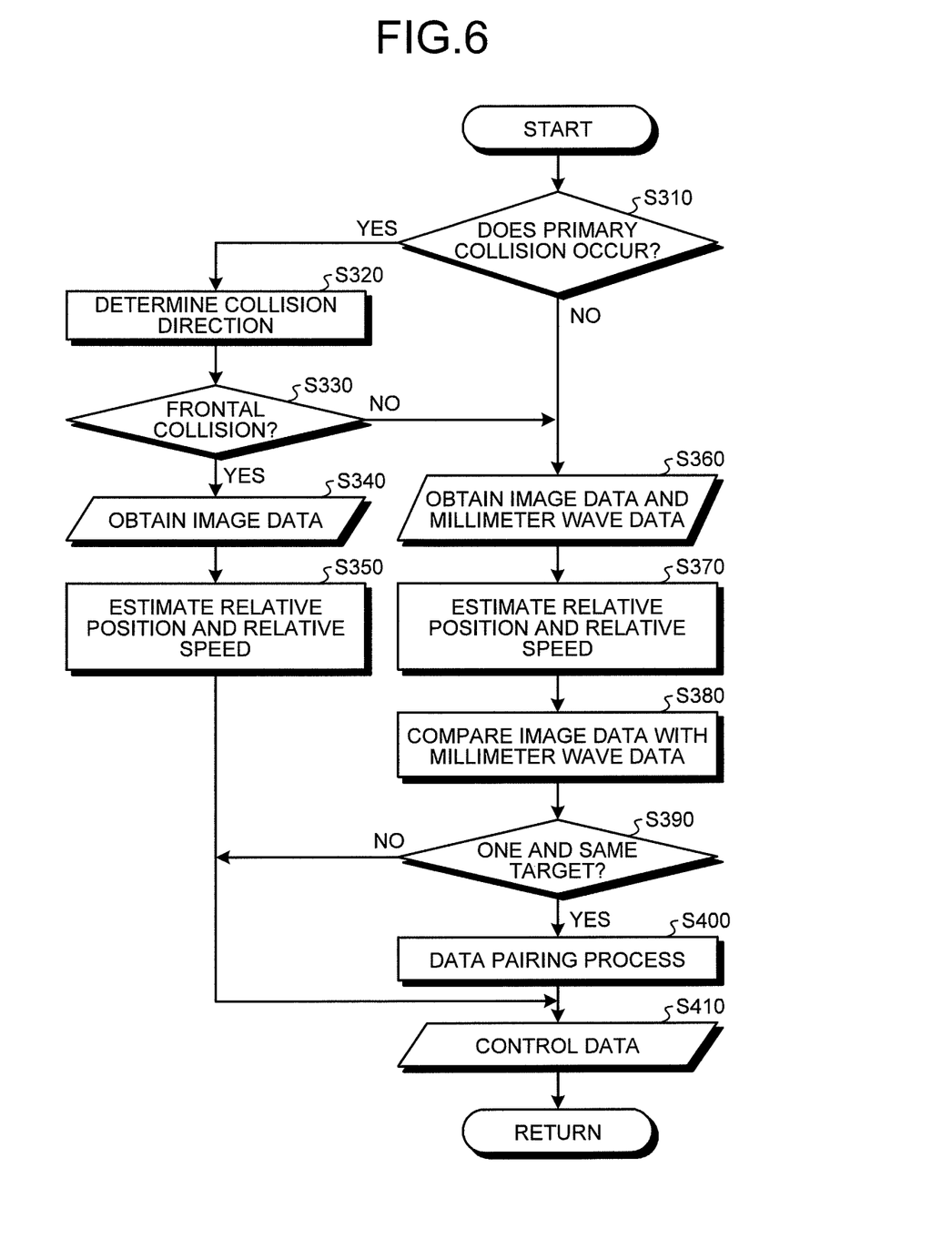
FIG. 6 is a flowchart of operation of a vehicle surrounding situation recognizing device according to a second embodiment.

A second embodiment is described with reference to FIG. 6. In the second embodiment, the same reference sign is assigned to a component having a function similar to that described in the above-described first embodiment and the description is not repeated. FIG. 6 is a flowchart of operation of a vehicle surrounding situation recognizing device according to the second embodiment. This embodiment is different from the above-described first embodiment in that a data pairing process is executed even after primary collision when a collision form is other than frontal collision. When the primary collision is the collision between an obstacle and a front face of a vehicle 100, so-called the frontal collision, it is highly possible that radar 9 is damaged from the primary collision. On the other hand, when the collision form of the primary collision is the form other than the frontal collision, for example, rear collision and side collision, the possibility that the radar 9 is damaged from the primary collision is considered to be lower than that in the case of the frontal collision. In this manner, it becomes possible to inhibit deterioration in accuracy of forward recognition of the vehicle by determining whether to execute the data pairing process according to the collision form.

Operation of a vehicle surrounding situation recognizing device 1 of the second embodiment is described with reference to FIG. 6. A control flow illustrated in FIG. 6 is repeatedly executed at a predetermined interval, for example. An operation flow (FIG. 2) of a vehicle control device 11 is executed subsequent to the control flow illustrated in FIG. 6, for example.

At step S310, an integrated control ECU 2 determines whether the primary collision occurs. When it is determined that the primary collision occurs as a result of the determination (step S310-Y), the procedure shifts to step S320, and otherwise (step S310-N), the procedure shifts to step S360.

At step S320, the integrated control ECU 2 determines a collision direction. The integrated control ECU 2 determines the collision direction of the obstacle with respect to the vehicle 100 based on a collision form signal obtained from an air bag ECU 7. The integrated control ECU 2 determines that the primary collision is the frontal collision when the collision form signal of the primary collision is a frontal collision signal. On the other hand, the integrated control ECU 2 determines that the primary collision is not the frontal collision when the collision form signal of the primary collision is other than the frontal collision signal. When step S320 is executed, the procedure shifts to step S330.

At step S330, the integrated control ECU 2 determines whether the primary collision is the frontal collision. The integrated control ECU 2 performs the determination at step S330 based on a determination result at step S320. When it is determined that the primary collision is the frontal collision at step S320, it is positively determined at step S330. When it is determined that the primary collision is the frontal collision as a result of the determination at step S330 (step S330-Y), the procedure shifts to step S340, and otherwise (step S330-N), the procedure shifts to step S360.

The integrated control ECU 2 obtains image data at step S340. When step S340 is executed, the procedure shifts to step S350, and the integrated control ECU 2 estimates a relative position and a relative speed based on the image data. When step S350 is executed, the procedure shifts to step S410.

At step S360, the integrated control ECU 2 obtains the image data and millimeter wave data. When step S360 is executed, the procedure shifts to step S370, and the integrated control ECU 2 estimates the relative position and the relative speed. The integrated control ECU 2 estimates the relative position and the relative speed based on the data as at step S50 in the above-described first embodiment (FIG. 1), for example. When step S370 is executed, the procedure shifts to step S380.

At step S380, the integrated control ECU 2 compares the image data with the millimeter wave data. The integrated control ECU 2 compares the both pieces of data and associates corresponding targets with each other as at step S60 in the above-described first embodiment (FIG. 1), for example. When step S380 is executed, the procedure shifts to step S390.

At step S390, the integrated control ECU 2 determines whether the associated targets are one and the same target. The integrated control ECU 2 performs the determination at step S390 as at step S70 in the above-described first embodiment, for example. When it is determined that the targets are one and the same target as a result of the determination at step S390 (step S390-Y), the procedure shifts to step S400, and otherwise (step S390-N), the procedure shifts to step S410.

At step S400, the integrated control ECU 2 performs the data pairing process. The integrated control ECU 2 executes the data pairing process as at step S80 in the above-described first embodiment, for example. When step S400 is executed, the procedure shifts to step S410.

At step S410, the integrated control ECU 2 generates control data. The integrated control ECU 2 generates the control data as at step S90 in the above-described first embodiment, for example. For example, when the data pairing process is performed, the integrated control ECU 2 makes values of the relative position, the relative speed and the like of the target determined by the data pairing the data for vehicle control. When it is determined that the targets are not one and the same target at step S390, the integrated control ECU 2 makes the relative position and the relative speed calculated from any one of image information and radar information the data for the vehicle control, for example. When it is determined that the collision is the frontal collision at step S330 and the procedure shifts to step S410 through steps S340 and S350, the integrated control ECU 2 makes the values of the relative position, the relative speed and the like based on the image information the data for the vehicle control. When step S410 is executed, this control flow is terminated.

As described above, the vehicle surrounding situation recognizing device 1 of this embodiment recognizes a situation in front of the vehicle not based on the radar information but based on the image information when the detected collision is the collision between the obstacle and the front face of the vehicle 100 (step S330-Y). Therefore, according to this embodiment, it is possible to switch whether to use the radar information by appropriately determining reliability of the radar 9 after the primary collision, thereby inhibiting deterioration in accuracy of the forward recognition of the vehicle.

[Variation of Second Embodiment]

Figure 7:
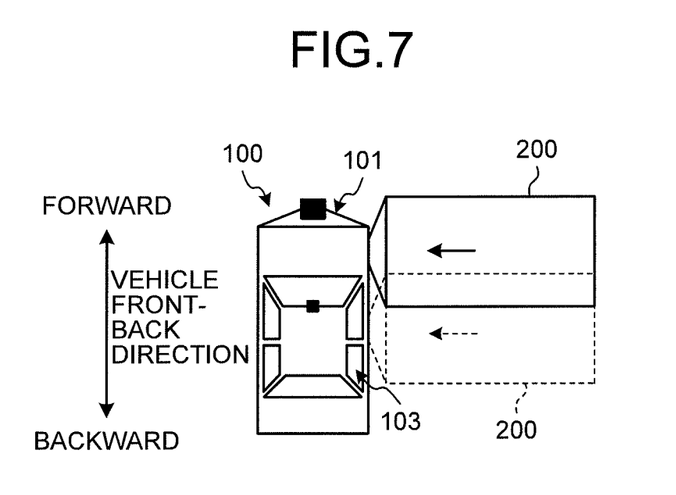
FIG. 7 is an illustrative diagram of a collision form according to a variation of the second embodiment.

A variation of the second embodiment is described. FIG. 7 is an illustrative diagram of a collision form according to the variation of the second embodiment. In the above-described second embodiment, when a collision form of primary collision is not frontal collision, forward recognition of a vehicle relying on millimeter wave data is performed also after primary collision. Herein, the collision form referred to as side collision includes a case where a radar 9 is likely to be damaged and where this is less likely to be damaged. For example, the collision form of another vehicle 200 indicated by a broken line in FIG. 7 is the form in which the other vehicle 200 collides toward a vehicle interior 103 out of the forms in which the other vehicle 200 collides with a vehicle 100 from the side. The collision form of the other vehicle 200 indicated by a solid line in FIG. 7 is the form in which the other vehicle 200 collides from the side toward a front part 101 of the vehicle 100.

When the other vehicle 200 collides with the front part 101 of the vehicle 100, it is considered that the radar 9 is likely to be damaged even in the case of the side collision. Therefore, an integrated control ECU 2 may recognize a situation in front of the vehicle not based on radar information but based on image information when the primary collision is the collision between an obstacle and the front part 101 of the vehicle 100. For example, when the obstacle collides with the front part 101 of the vehicle 100, it is possible to recognize the situation in front of the vehicle not based on the radar information but based on the image information thereafter regardless of a collision direction.

An example of a method of determining whether the primary collision is the collision between the obstacle and the front part 101 of the vehicle 100 (hereinafter, simply referred to as "collision with the vehicle front part") is described. When the primary collision is the frontal collision, the integrated control ECU 2 can determine that this is the collision with the vehicle front part. When the primary collision is the side collision and when a side air bag and a curtain shield air bag do not activate, the integrated control ECU 2 may determine that this is the collision with the vehicle front part. When the side air bag and the curtain shield air bag do not activate, it is highly possible that the obstacle collides with a portion away from a B pillar and it is highly possible that this falls under the collision with the vehicle front part.

The integrated control ECU 2 may further determine whether the primary collision is the collision with the vehicle front part based on a detection result of a yaw rate sensor. For example, when rotational motion of certain magnitude or larger is generated in the vehicle 100 by the primary collision, it may be determined that the collision with the vehicle front part occurs. For example, when the obstacle collides with the vehicle 100 from a right side in a travel direction as illustrated in FIG. 7, if the vehicle 100 rotates in a counterclockwise direction as seen from above, this is highly possibly the collision with the vehicle front part. Alternatively, the integrated control ECU 2 can also determine the collision with the vehicle front part based on a detection result of a collision detecting sensor such as a satellite sensor arranged on the front part 101 of the vehicle 100.

[Variation of Each Embodiment Described Above]

A variation of the above-described first and second embodiments is described. A vehicle surrounding situation recognizing device 1 may be configured without including at least any one of a radar 9 and an image generating means 10. For example, the vehicle surrounding situation recognizing device 1 may be configured without including the radar 9 and the image generating means 10 and obtain radar information and image information from the radar 9 and the image generating means 10 outside the vehicle surrounding situation recognizing device 1.

A mounting position of the radar 9 is not limited to that illustrated in the above-described embodiments. The radar 9 may be mounted on a central lower portion of a front bumper, in the vicinity of a number plate, on a right or left end of the front bumper and the like, for example. That is to say, the radar 9 may be mounted on a front part 101 of a vehicle 100 so as to be able to detect a situation in front of a vehicle. The image generating means 10 may take a stereo image by one imaging device. The image generating means 10 is not limited to a stereo camera.

The image generating means 10 is not limited to a so-called camera and may be a distance image sensor, for example. The distance image sensor ranges by using a laser and the like and generates distance image data in which each pixel and distance data obtained for the pixel are associated with each other. The distance image sensor outputs the generated distance image data as image information. When such distance image sensor and the like is arranged within a vehicle interior 103 as the image generating means 10 also, the vehicle surrounding situation recognizing device and a vehicle control device of the above-described embodiments have an effect.

Contents disclosed in the above-described embodiments and variations can be appropriately combined to be executed.

REFERENCE SIGNS LIST

1 Vehicle surrounding situation recognizing device
2 Integrated control ECU
3 Brake ECU
4 Brake actuator
5 EPS_ECU
6 EPS actuator
7 Air bag ECU
9 Radar
10 Image generating means
11 Vehicle control device
100 Vehicle
101 Front part
103 Vehicle interior
200 Another vehicle

The invention claimed is:

1. A vehicle system, comprising:
   a radar mounted on a front part of a vehicle and configured to transmit an electromagnetic wave in front of the vehicle, receive a reflective wave based on the electromagnetic wave, and output radar information based on the reflective wave;
   a camera mounted within a vehicle interior of the vehicle and configured to generate an image of a scene in front of the vehicle and output image information based on the image of the scene in front of the vehicle; and
   an electronic control unit (ECU) configured to detect an object in front of the vehicle based on both the radar information and the image information; and
   detect a collision of the vehicle with an obstacle based on a frontal collision signal, wherein
      the ECU is configured to detect the object in front of the vehicle using the image information, without using the radar information, after detecting the collision.

2. The vehicle system according to claim 1, wherein the ECU is configured to:
   determine that the front part of the vehicle collided with the obstacle; and
   detect the object in front of the vehicle using the image information, without using the radar information, based on determining that the front part of the vehicle collided with the obstacle.

3. The vehicle system according to claim 2, wherein the ECU is configured to:
   detect the object in front of the vehicle using the image information, without using the radar information, based on determining that a front face of the vehicle collided with the obstacle.

4. A vehicle control system, comprising:
   a radar mounted on a front part of a vehicle and configured to transmit an electromagnetic wave in front of the vehicle, receive a reflective wave based on the electromagnetic wave, and output radar information based on the reflective wave;
   a camera mounted within a vehicle interior of the vehicle and configured to generate an image of a scene in front of the vehicle and output image information based on the image of the scene in front of the vehicle; and
   an electronic control unit (ECU) configured to:
      detect an object in front of the vehicle based on the radar information and the image information;
      detect a collision of the vehicle with an obstacle;
      detect the object in front of the vehicle using the image information, without using the radar information, after detecting the collision; and
      control motion of the vehicle based on the image information to permit a reduction in damage from a secondary collision after the collision.

5. The vehicle control system according to claim 4, wherein the ECU is configured to:
   determine that the front part of the vehicle collided with the obstacle; and
   based upon determining that the front part of the vehicle collided with the obstacle, detect the object in front of the vehicle using the image information without using the radar information.

6. The vehicle control system according to claim 5, wherein the ECU is configured to:
   detect the object in front of the vehicle using the image information without using the radar information based on determining that a front face of the vehicle collided with the obstacle.

7. A method, comprising:
   receiving, by an electronic control unit (ECU) of a vehicle, sensor information from a sensor that is disposed at a front of the vehicle;

receiving, by the ECU of the vehicle, image information from a camera that is disposed in an interior of the vehicle;

performing, by the ECU of the vehicle, first object detection using both the sensor information and the image information;

detecting, by the ECU, a collision associated with the vehicle; and performing, by the ECU of the vehicle, second object detection using the image information without using the sensor information, based on detecting the collision associated with the vehicle.

8. A method, comprising:

receiving, by an electronic control unit (ECU) of a vehicle, sensor information from a sensor that is disposed at a front of the vehicle;

receiving, by the ECU of the vehicle, image information from another sensor of the vehicle;

performing, by the ECU of the vehicle, first object detection using both the sensor information and image information;

detecting, by the ECU, a collision associated with the vehicle;

performing, by the ECU of the vehicle, second object detection using the image information without using the sensor information, based on detecting the collision associated with the vehicle; and controlling, by the ECU of the vehicle, a motion of the vehicle based on performing the second object detection using only the image information.

9. The method of claim 8, further comprising:

determining, by the ECU, that the collision is a frontal collision based on a frontal collision signal; and performing, by the ECU, the second object detection using the image information without using the sensor information based on determining that the collision is a frontal collision.

10. The method of claim 8, further comprising:

performing, by the ECU, at least one of an automatic braking function and an automatic steering function; and controlling, by the ECU, the motion of the vehicle based on performing the at least one of the automatic braking function and the automatic steering function.

11. The method of claim 8, wherein the other sensor is a camera.

12. The method of claim 8, wherein the other sensor is disposed in an interior of the vehicle.

* * * * *